US012582138B2

(12) United States Patent

Porro et al.

(10) Patent No.: US 12,582,138 B2

(45) Date of Patent: Mar. 24, 2026

(54) ROBOTIZED LINE FOR THE PRODUCTION OF CHOCOLATE PRODUCTS

(71) Applicant: TECNO 3 S.r.l., Corneliano d'Alba (IT)

(72) Inventors: Bruno Porro, Corneliano d'Alba (IT); Marco Saini, Corneliano d'Alba (IT); Riccardo Federici, Corneliano d'Alba (IT)

(73) Assignee: TECNO 3 S.r.l., Corneliano d'Alba (IT)

( * ) Notice: Subject to any disclaimer, the term of this patent is extended or adjusted under 35 U.S.C. 154(b) by 116 days.

(21) Appl. No.: 18/432,557

(22) Filed: Feb. 5, 2024

(65) Prior Publication Data

US 2024/0260603 A1 Aug. 8, 2024

(30) Foreign Application Priority Data

Feb. 6, 2023 (EP) .................................... 23155056

(51) Int. Cl.

| | |
|---|---|
| A23G 1/00 | (2025.01) |
| A23G 1/20 | (2006.01) |
| A23G 1/22 | (2006.01) |
| A23G 1/26 | (2006.01) |
| A23G 1/28 | (2006.01) |
| A23G 7/02 | (2006.01) |
| B25J 11/00 | (2006.01) |

(52) U.S. Cl.
CPC ......... *A23G 1/0093* (2013.01); *A23G 1/0063* (2013.01); *A23G 1/0079* (2013.01); *A23G 1/0096* (2013.01); *A23G 1/205* (2013.01); *A23G 1/22* (2013.01); *A23G 1/26* (2013.01); *A23G 1/28* (2013.01); *A23G 7/02* (2013.01); *B25J 11/0045* (2013.01)

(58) Field of Classification Search
CPC ............................... A23G 1/0093; A23G 1/26
See application file for complete search history.

(56) References Cited

U.S. PATENT DOCUMENTS

2020/0337331 A1* 10/2020 Chong ................. A23G 7/0025
2021/0084927 A1 3/2021 Knobel

FOREIGN PATENT DOCUMENTS

| EP | 0940086 A1 | 9/1999 |
|---|---|---|
| EP | 3111768 A | 1/2017 |
| WO | 2019081716 A1 | 5/2019 |

OTHER PUBLICATIONS

European Search Report dated Jul. 14, 2023. 7 pages.

* cited by examiner

*Primary Examiner* — John J DeRusso
(74) *Attorney, Agent, or Firm* — RMCK Law Group PLC

(57) ABSTRACT

A robotized line for the production of chocolate products, including a casting chamber, a refrigerated chamber and a demoulding chamber, wherein each of the chambers is equipped with an anthropomorphic robot able to move the moulds during several steps of the production process.

8 Claims, 11 Drawing Sheets

26

6

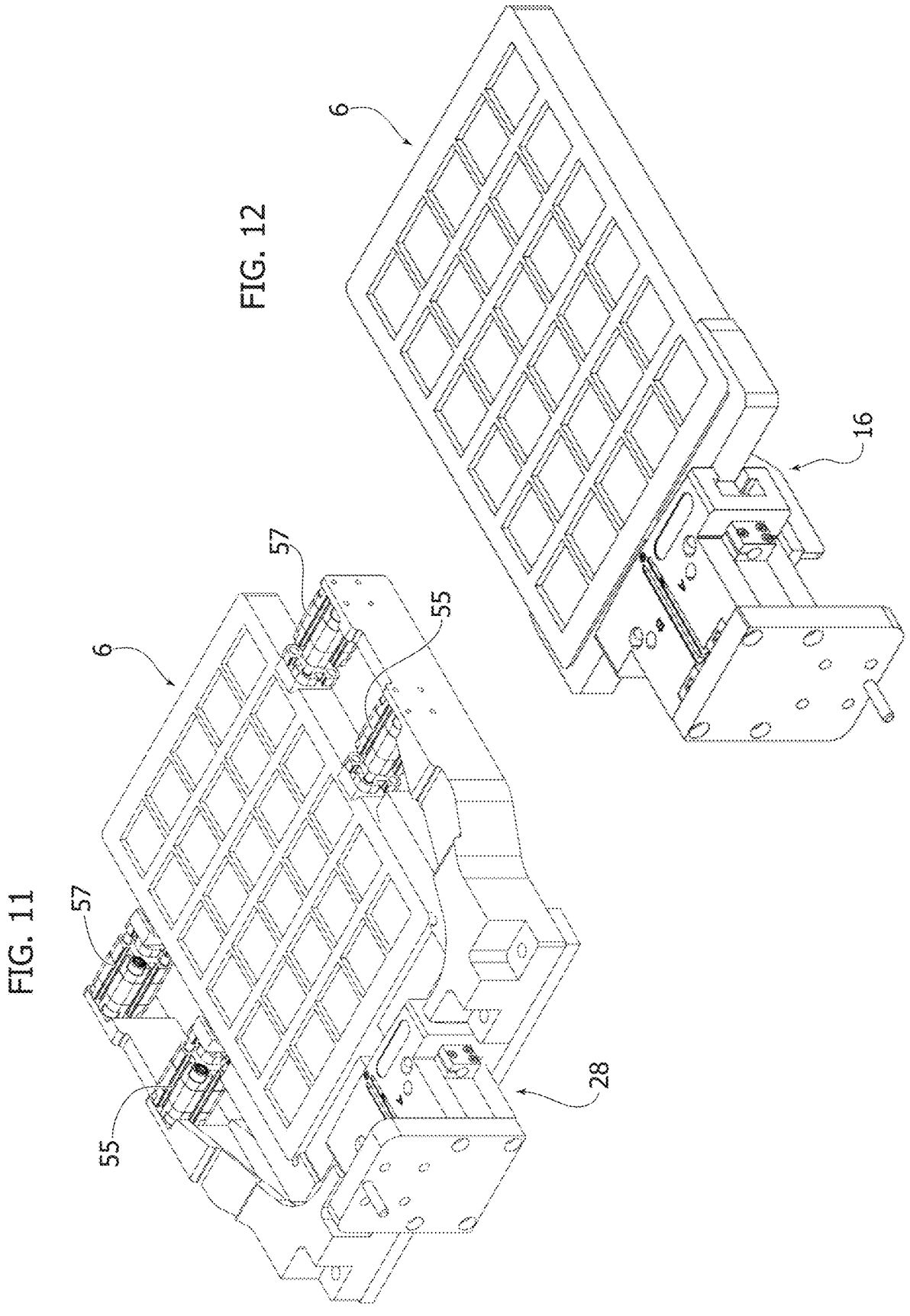

ROBOTIZED LINE FOR THE PRODUCTION OF CHOCOLATE PRODUCTS

CROSS-REFERENCE TO RELATED APPLICATION

This application claims priority to European Patent Application No. 23155056.7 filed Feb. 6, 2023. The disclosure of the above application is incorporated herein by reference in its entirety.

FIELD OF THE INVENTION

The present invention refers to the production of chocolate products like chocolates, chocolate tablets, chocolate bars, etc. More specifically, the invention relates to a robotized line for the production of chocolate products.

PRIOR ART

For the production of chocolate products, plastic or metal moulds of various sizes with cavities having the shape of the desired products, are usually used.

A production cycle typically provides that the moulds are subjected to a series of operations including: filling in a casting machine, vibrating, cooling, twisting, product extraction.

In traditional solutions, the moulds are typically moved among the various working stations in a fixed direction by means of conveyor chains or belts.

For example, EP-A-0940086 discloses a line for the production of chocolate products including various stations served by transfer devices.

Traditional lines are generally advantageous in case of large plants wherein the production sequence is fixed in a preset way, and which are rarely to be converted to the production of different products. Traditional lines are generally designed and built for the production of a specific product, for example pralines or filled bars, so as to allow high production rates with great precision.

The conversion of production lines from a product to another is typically complex and, in some cases, even impossible. Conventional production lines can be problematic when relatively small lots are to be produced.

EP-A-3111768 discloses a system for the production of chocolate products, comprising at least one processing station and at least one industrial robot, controlled by a control device, which can be set so that the moulds, while moving along a preset path, can undergo various processing operations like: shaking, centrifuging, rotating, overturning, sliding, lifting, lowering, blowing, vacuuming, cleaning, stacking.

A line for the production of chocolate products served by industrial robot allows to improve the production flexibility and to change rapidly the type of products that are meant to be produced.

However, in the prior art it remains the need for completely automatic and highly compact robotized lines, having optimised layouts for high efficiency, automatic execution of specific operation sequences and easily configurable for the production of different products.

OBJECT AND SUMMARY OF THE INVENTION

The object of the present invention is to provide a robotized line for the production of chocolate products which fulfils said need.

According to the present invention, this object is achieved by a robotized line having the features forming the subject of claim 1.

Preferred embodiments in the invention are the subject of the dependent claims.

The claims form an integral part of the teaching given in relation to the invention.

BRIEF DESCRIPTION OF THE DRAWINGS

The present invention will now be described in detail with reference to the attached drawings, given purely as a non-limiting example, wherein:

FIG. 11 is a detailed view of the robot gripping pliers indicated by the arrow XI in FIG. 9; and FIG. 12 is a detailed view of the robot gripping pliers indicated by the arrow 12 in FIG. 8.

Figure 1:
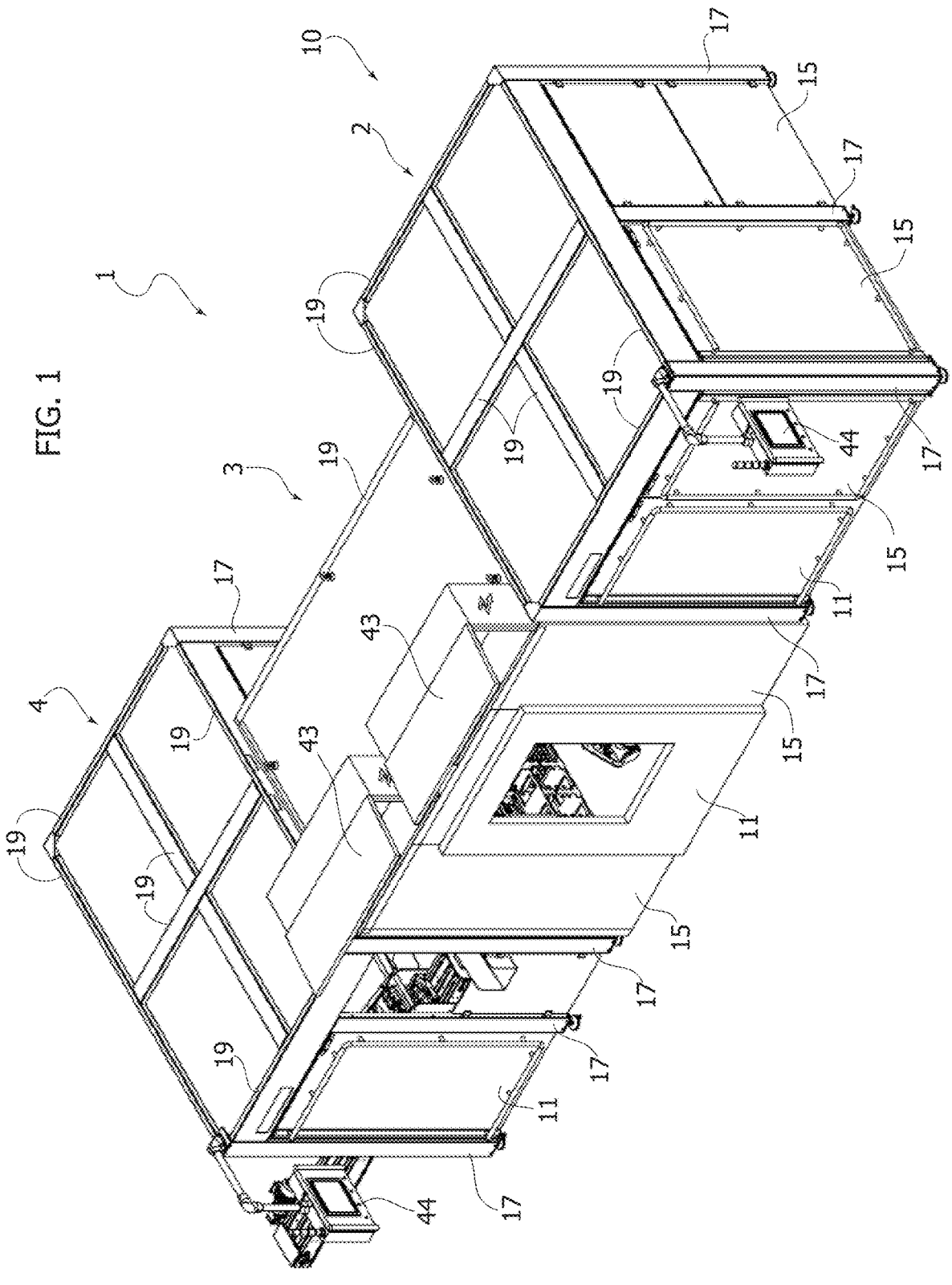
FIG. 1 is a perspective view of a robotized line according to the present invention.

It will be appreciated that the accompanying drawings are schematic and that in certain figures some components may not be shown to simplify the understanding of the figures. It will also be appreciated that various figures may not be shown to the same scale.

DETAILED DESCRIPTION

Referring to FIGS. 1 to 5, the numeral reference 1 indicates a robotized line for the production of chocolate products. The line 1 comprises a casting chamber 2, a refrigerated chamber 3 and a demoulding chamber 4.

Referring to FIGS. 2 to 5, the robotized line 1 comprises a support load-bearing structure 10 which supports a plurality of walls 15 which delimit the three chambers 2, 3, 4, isolating them both from each other and from the outside.

The support load-bearing structure 10 comprises a plurality of vertical uprights 17 fixed to the ground and a plurality of horizontal beams 19 which are connected to each other at the upper ends of the vertical uprights 17, forming a structure with a cage like layout.

Figure 2:
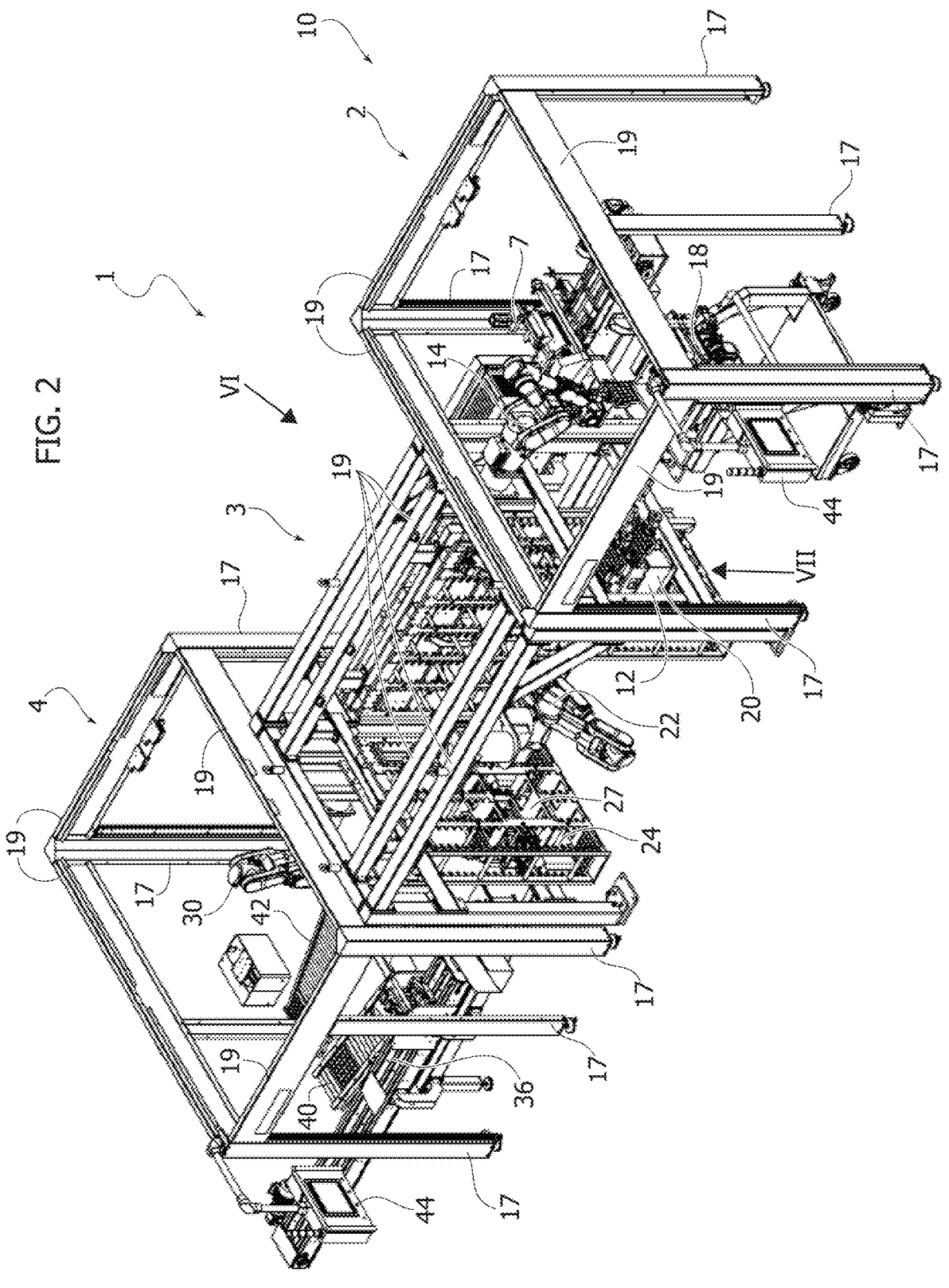
FIG. 2 is a perspective view of the robotized line of FIG. 1 without perimetral walls.

Referring to FIG. 2, the casting chamber 2 and the refrigerated chamber 3 are in communication with each other in a first interface zone 12, in which a vibration unit 20 is located.

Referring to FIG. 2, the refrigerated chamber 3 and the demoulding chamber 4 are in communication with each other in a second interface zone 27 in which a twist unit 26 is located.

Figure 3:
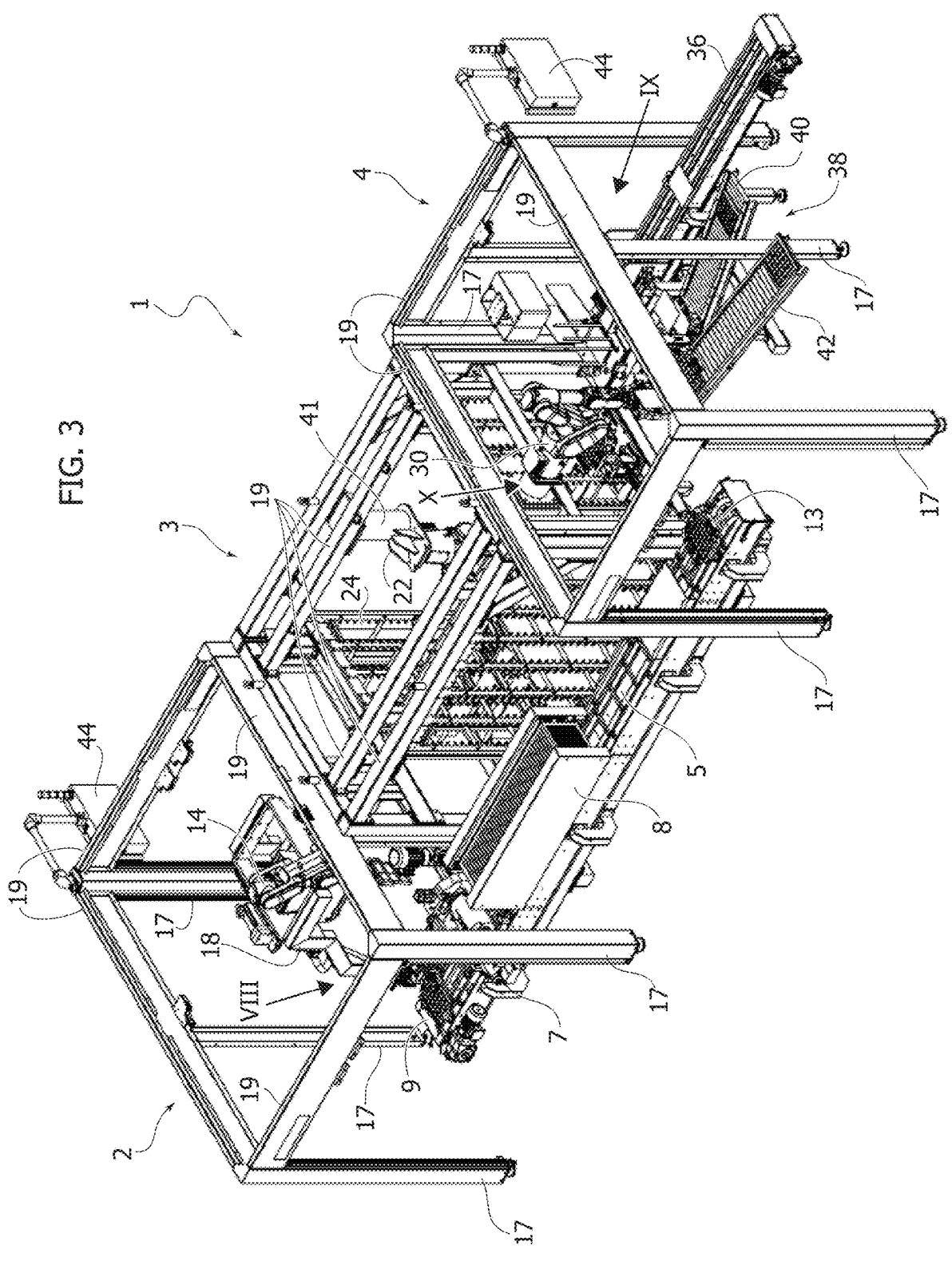
FIG. 3 is a posterior perspective view of the robotized line of FIG. 2.

Referring to FIG. 3, the robotized line 1 comprises a transfer conveyor 5 which transfers the moulds 6 from the demoulding chamber 4 to the casting chamber 2. The transfer conveyor 5 has an inlet station 13 located in the demoulding chamber 4 and an outlet station 9 located in the casting chamber 2. The transfer conveyor 5 has a middle section which extends outside the chambers 2, 3, 4.

Referring to FIG. 3, the transfer conveyor 5 extends through a heating tunnel 8, equipped with elements, for example infrared elements, for heating the moulds 6.

At the outlet of the heating tunnel 8, a cleaning unit 7 can be arranged, placed in proximity to the outlet station 9, for cleaning the moulds 6 and equipped, for example, with a cleaning roller.

Figure 4:
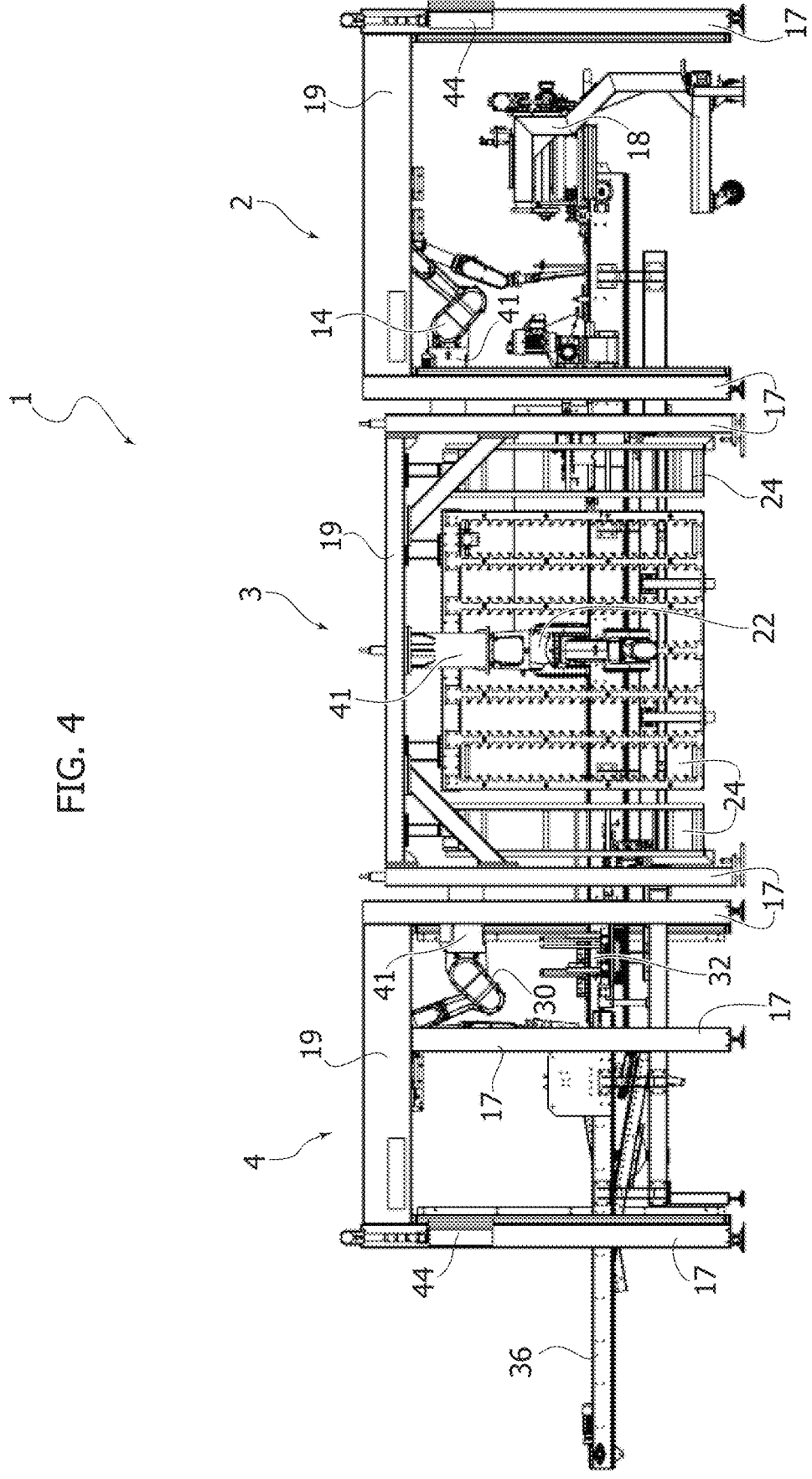
FIG. 4 is a front view of the robotized line of FIG. 2.
Figure 5:
FIG. 5 is a plan view of the robotized line of FIG. 2.

Referring to FIG. 4, the robotized line 1 comprises a finished products conveyor 36 which extends through an aperture of the demoulding chamber 4.

The robotized line 1 further comprises a mould exit roller conveyor 40 and a mould reintegration roller conveyor 42 which extend through respective apertures in the demoulding chamber 4.

Each of the three chambers 2, 3, 4 is provided with doors 11 located in the perimetral walls 15.

Referring to FIGS. 2 to 8, inside the casting chamber 2, a first robot 14 and a casting machine 18 are placed. The first robot 14 is an anthropomorphic robot configured to move moulds 6 inside the casting chamber 2, in the way that will be disclosed hereafter.

Figure 6:
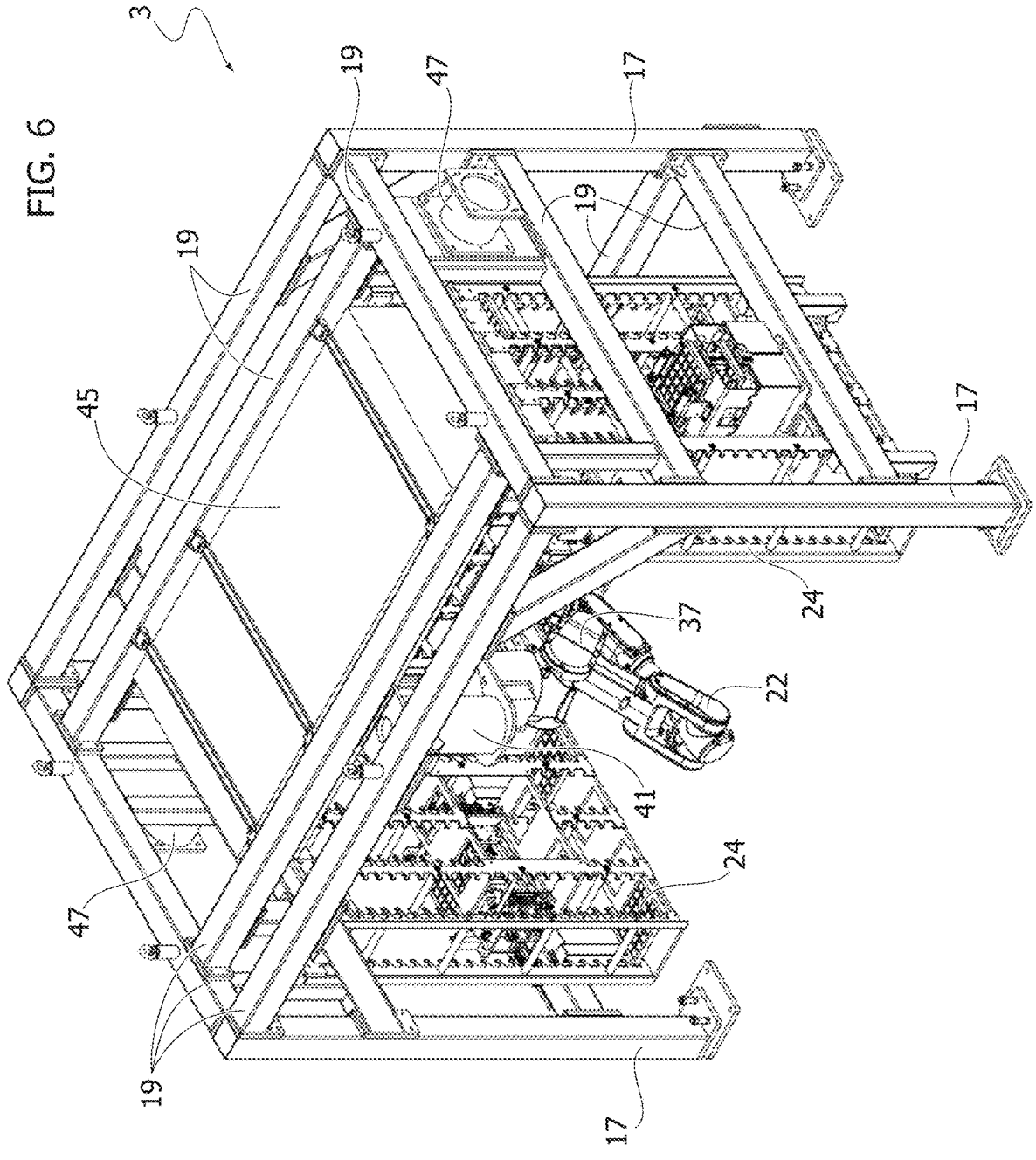
FIG. 6 is a perspective view of the refrigerated chamber indicated by the arrow VI in FIG. 2.
Figure 7:
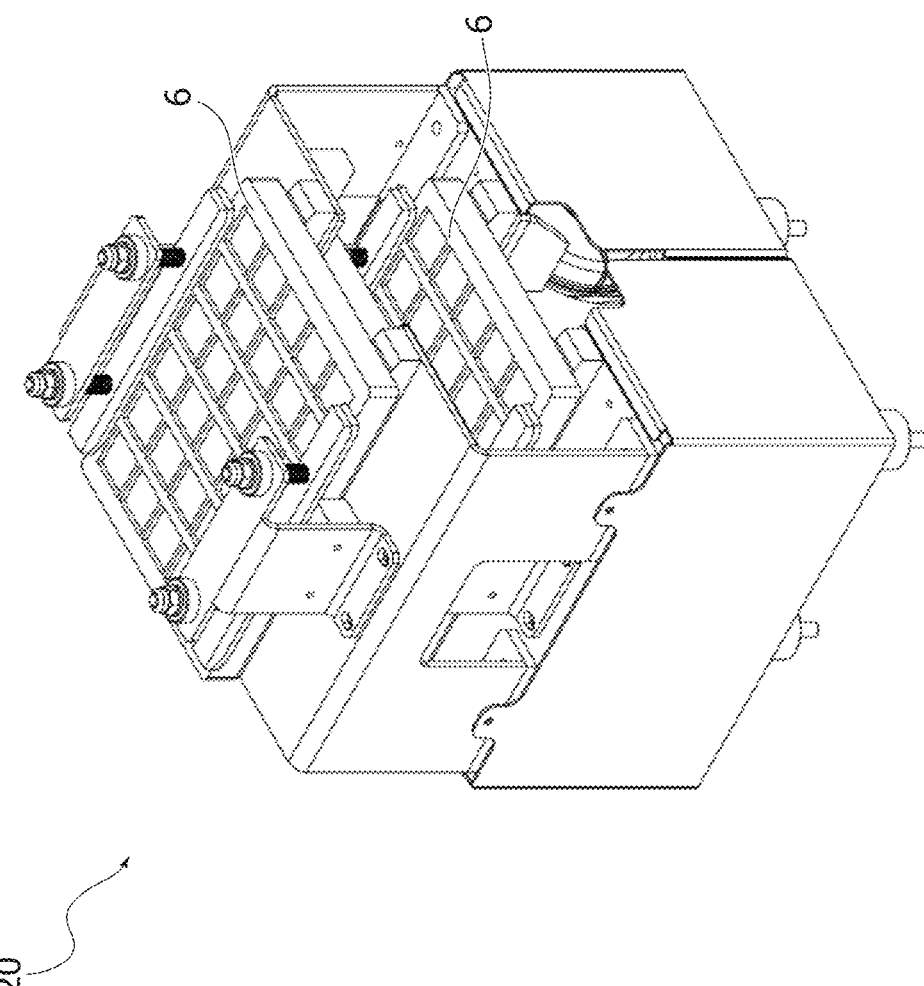
FIG. 7 is a detailed perspective view of the vibrating station indicated by the arrow VII in FIG. 2.

Referring to FIG. 6, the robotized line 1 comprises a refrigerating unit 45, configured to cool down the refrigerated chamber 3. The refrigerating unit 45 can be supported by the upper horizontal beams 19 of the support lead-bearing structure 10.

Inside the refrigerated chamber 3, shelves 24 are arranged, configured to receive moulds 6 and located along the internal walls of the refrigerated chamber 3. Inside the refrigerated chamber 3 a second robot 22 is further placed. The second robot 22 is an anthropomorphic robot configured to move the moulds 6 inside the refrigerated chamber 3 in the way that will be disclosed hereafter.

Figure 9:
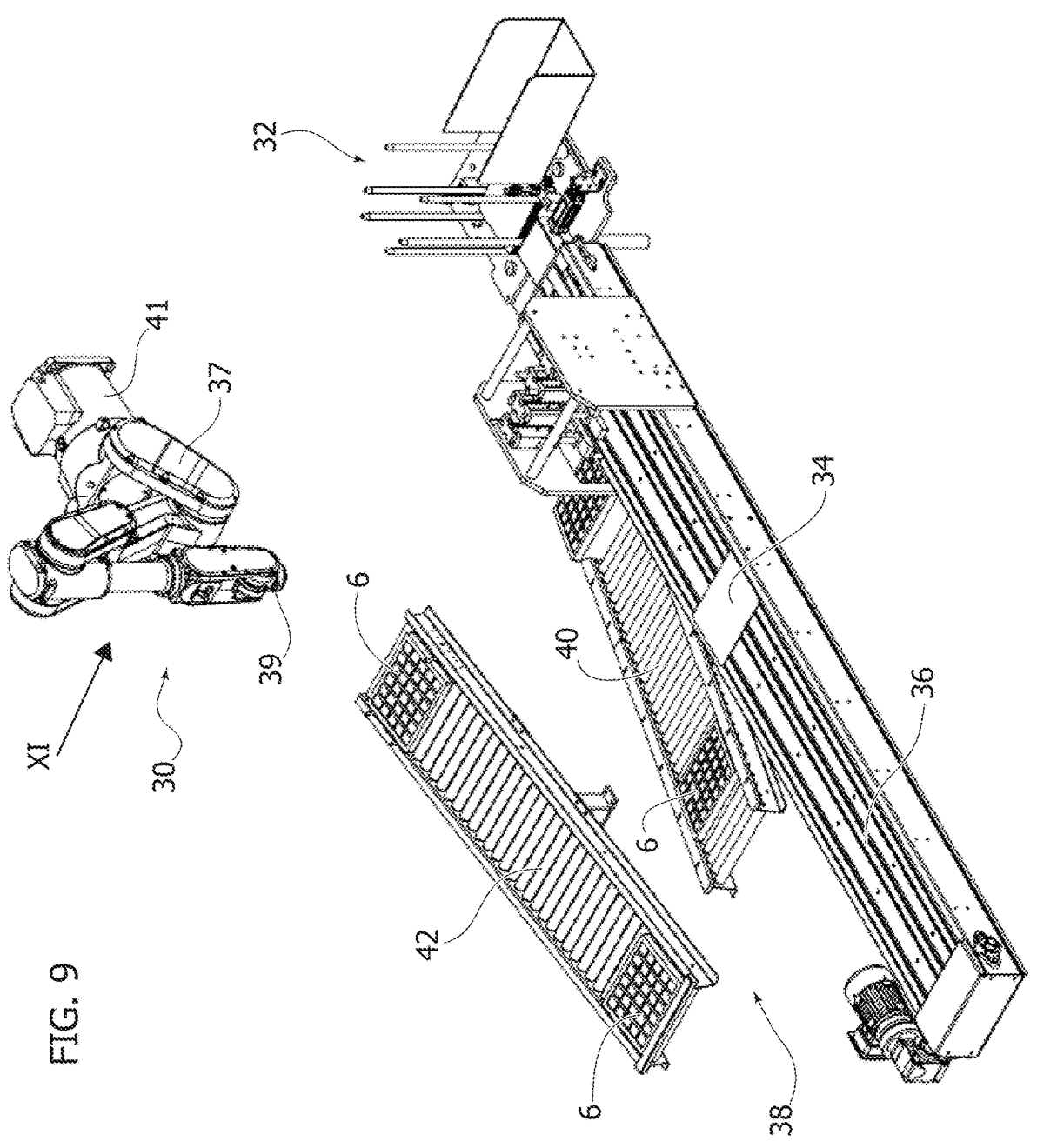
FIG. 9 is a perspective view of the inside of the demoulding chamber, of the mould exit roller conveyor and the mould reintegration roller conveyor indicated by the arrow IX in FIG. 3.
Figure 10:
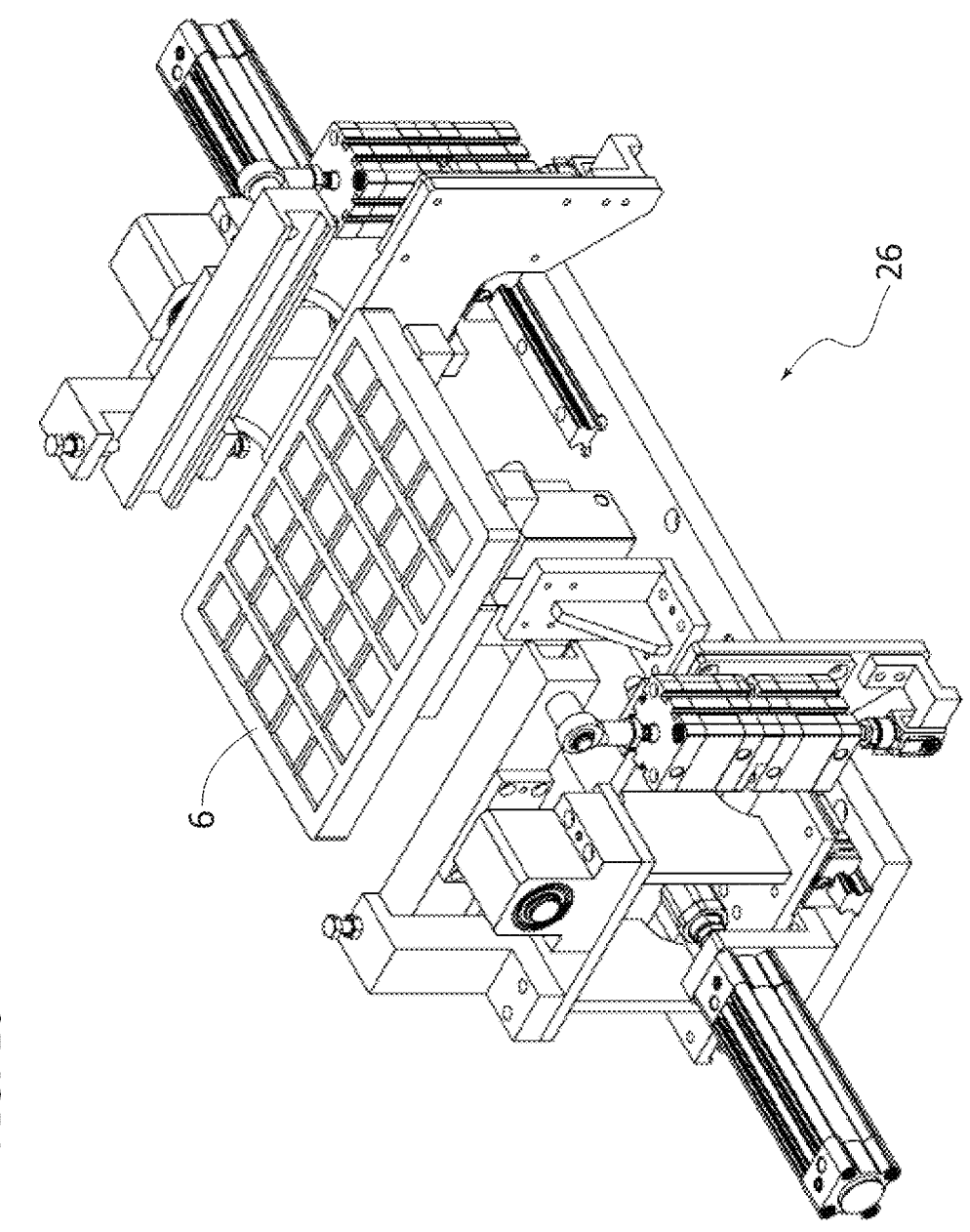
FIG. 10 is a detailed perspective view of the twist unit indicated by the arrow X in FIG. 3.

Referring to FIG. 9, inside the demoulding chamber 4, a third robot 30, a boards dispenser 32, an inlet section of the finished products conveyor 36, a mould control station 38, the exit mould roller conveyor 40 and the reintegration mould roller conveyor 42 already cited before, and the inlet station 13 of the transfer conveyor 5 are located. The third robot 30 is an anthropomorphic robot configured to move the moulds 6 inside the demoulding chamber 4, in the way that will be disclosed hereafter.

Referring to FIG. 1, the robotized line 1 comprises an electronic control unit 43 which controls the movements of the robots 14, 22, 30. The electronic control unit 43 can be connected to user interface devices 44. Referring to FIGS. 2 to 4, each of the three robots 14, 22, 30, is an anthropomorphic robot equipped with an articulated arm 37, capable of operating inside respective chamber thanks to a wrist 39 on its end. The articulation of the articulated arm 37 is such to allow the wrist 39 to move and rotate along all the spatial directions. Each of the three robots 14, 22, 30 is further equipped with a base 41 fixed to the support load-bearing structure 10 by means of a support 47, located in proximity to upper portions of the vertical uprights 17, in such a way to avoid encumbrance on the ground and to facilitate the access to the chambers 2, 3, 4, for example for maintenance or cleaning operations.

Referring to FIGS. 6 to 12, the operation of the robotized line 1 is described hereafter.

Figure 8:
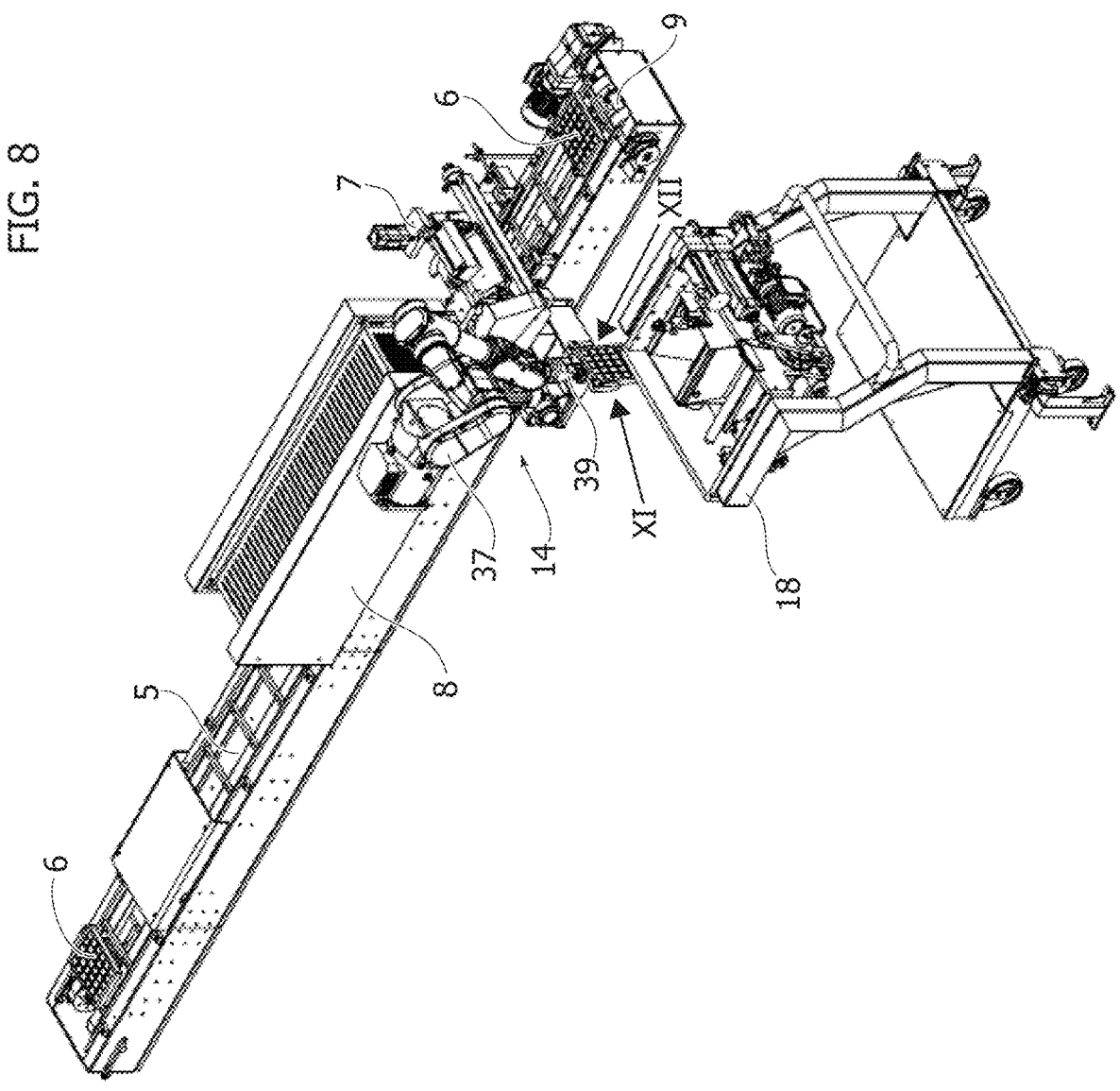
FIG. 8 is a perspective view of the entrance belt in the casting chamber and of the inside of the casting chamber indicated by the arrow VIII in FIG. 3.

Referring to FIG. 8, the mould transfer conveyor 5, feeds the moulds 6 to the first casting chamber 2 along the direction A. Along the path of the mould transfer conveyor 5, before the moulds 6 are introduced into the casting chamber 2, the moulds 6 are heated while passing through the heating tunnel 8 and are cleaned by passing through the cleaning unit 7. The object of the cleaning unit 7 is to remove any residue of chocolate from the moulds 6 so as to provide clean moulds 6 to a new casting step.

Once cleaned the moulds 6 are introduced inside the first casting chamber 2 and arrive to the outlet station 9 of the mould transfer conveyor 5 located inside the first casting chamber 2.

Inside the casting chamber 2, the first robot 14 picks the clean moulds 6 located at the outlet station 9 by means of pliers 16 (FIG. 12) and places them at a casting station below the casting machine 18. At the casting station, the moulds 6 are filled with melted chocolate dispensed by the casting machine 18.

After the filling, the first robot 14 transfers the moulds 6 containing the melted chocolate on the vibration unit 20 located at the interface 12 between the casting chamber 2 and the refrigerated chamber 3.

The vibration unit 20 vibrates the moulds 6 in order to free any air bubbles trapped inside the melted chocolate so as to provide a homogeneous product.

In a possible embodiment, the vibration unit 20 may comprise at least two vibrating shelves, configured to receive respective moulds 6 so as to avoid any slowdown due to the duration of the vibration step (about eight seconds per mould).

The vibration unit 20 may be provided with two pneumatic cylinders which form a stop for the mould 6 once it has been inserted by the robot 14. These stops make sure that the flow of moulds in the line 1 is unidirectional from the casting chamber 2 towards the refrigerated chamber 3 and that there is no possibility to pick the mould 6 from the vibrating unit 20 by the first robot 14, which deposited it. Once the vibration step is finished, the second robot 22, located in the refrigerated chamber 3, picks the moulds 6 located in the vibration unit 20 by means of pliers 16 and places them on shelves 24 arranged along the walls of the refrigerated chamber 3.

The refrigerated chamber 3 is provided with a refrigeration system 45 located above the refrigerated chamber 3, which is fed with a flow of cold water (for example at a temperature of 4° C.).

A temperature of about 8 to 12° C., for example about 10° C. is maintained in the refrigerated chamber. The moulds 6 are left in the refrigerated chamber for the time necessary for the chocolate contained in the moulds to solidify (for example 30 minutes).

The electronic control unit 43 keeps in memory the location and the time at which each of the moulds 6 has been placed on the shelves 24 of the refrigerated chamber 3. Once the preset amount of time for the solidification has passed, the second robot 22 picks the moulds 6 from the shelves 24 and places them on the twist unit 26 located at the interface between the refrigerated chamber 3 and the demoulding chamber 4.

Once the moulds 6 containing the solidified chocolate products have been placed on the twist unit 26, this applies on the moulds 6 a twisting movement which causes an elastic deformation that facilitates the detachment of the solid chocolate products from respective moulds 6.

The board dispenser 32 located in the demoulding chamber 4 comprises a plurality of stacked up boards 34 and is configured to isolate single boards 34.

The first robot 30, located in the demoulding chamber 4, is equipped with pliers 28 (FIG. 11) equipped with two fingers 55 for grabbing the moulds 6 and with pressure elements 57 to hold the board 34 pushed against respective moulds 6. Fingers 55 for grabbing of the moulds 6 and pressure elements 57 are operable independently from each other.

The third robot 30 is configured to grab by means of pliers 28 a mould 6 located on the twist unit 26 and to take the mould 6 under the board dispenser 32. The board dispenser 32 let a board 34 drop above the mould 6 so as to cover the solid chocolate products located in the mould 6 with a respective board 34.

Then, the pliers 28 of the third robot 30 grabs the ensemble of the mould 6 and the respective board 34 and overturns it of 180°.

The third robot 30 moves the mould 6 with the respective board 34 in a demoulding station where a hammer unit can be provided, which may apply a hammering on the face of the mould 6 opposite to the board 34 to facilitate detachment of chocolate products from respective seats of the mould 6 so that they can deposit on the board 34.

Then, the third robot 30 lifts the mould 6 from the board 34 on which the chocolate products remain deposited.

On the finished product conveyor 36, the finished chocolate products are therefore arranged on respective boards 34. The finished product conveyor 36 transfers towards the outside of the robotized line 1 the finished chocolate products towards following stations where they can undergo following steps, for example wrapping, packaging, etc.

The empty moulds 6 are moved by the third robot 30 towards a demoulded mould control station 38. Here, a vision system checks whether chocolate products which were not detached from the moulds 6 remain inside the moulds 6. If the mould 6 contains residual chocolate products, the mould 6 is transferred on the moulds exit roller conveyor 40, configured to move the moulds 6 outside the robotized line 1, where the moulds may be cleaned manually. The clean moulds 6 may be reintroduced in the robotized line 1 by means of the mould reintegration roller conveyor 42.

The third robot 30 may be configured to place the empty moulds 6 (both the moulds which were correctly emptied after the twisting phase, and the mould 6 reintroduced by the mould reintegration roller conveyor 42 in the inlet station 13 of the mould transfer conveyor 5.

From the inlet station 13, the empty moulds 6 are again transferred to the casting chamber 2 for a new production cycle.

A particularly advantageous feature of the solution according to the present invention is that the robots are hanging from the sides of the structure of the refrigerated chamber. With respect to a solution in which the robots are fixed on the ground, the solution according to the present invention makes the cleaning easier since it avoids the presence on the ground of slits, cables, etc.

Fixing the robots to the structure of the refrigerated chamber allows to make the structure of the casting chamber and demoulding chamber lighter and cheaper, since these do not have to bear the robots. This arrangement allows also to simplify the transport of the line by reducing the operations of disassembly and reassembly. Wiring and calibration of the robots may be done in a workshop and do not need to be repeated after the transport, which implies a reduction of costs and a more rapid starting. The structure of the refrigerated chamber, which is more robust due to the need of bearing the robots, is hidden by the insulation, resulting in an advantage in aesthetics and in visibility through protections.

The robotized line according to the present invention does not need chain conveyors which are very difficult to keep clean.

The solution according to the present invention allows to simplify the structure of the refrigerated chamber (which can be constituted by a simple shelving) with respect to solutions according to the prior art which require lifters and descenders with shelves.

Of course, the details of construction and the embodiments can be widely varied with respect to those described and illustrated, without thereby departing from the scope of the invention as defined by the claims that follow.

The invention claimed is:

1. A robotized line for production of chocolate products formed into moulds, comprising:

a casting chamber comprising a casting machine, a demoulding chamber, a refrigerated chamber comprising a plurality of shelves provided with seats configured to receive respective moulds, wherein the refrigerated chamber is located in a central position between the casting chamber and the demoulding chamber, a mould transfer conveyor having an inlet section located in the demoulding chamber and an outlet section located in the casting chamber, a vibration unit located at an interface zone between the casting chamber and the refrigerated chamber, a twist unit located at an interface zone between the refrigerated chamber and the demoulding chamber, a first robot located in the casting chamber and configured to pick subsequent empty moulds from the outlet section of the mould transfer conveyor, to place subsequent moulds near the casting machine for their filling with melted chocolate, and to place subsequent full moulds in the vibration unit, a second robot located in the refrigerated chamber and configured to pick subsequent full moulds in the vibration unit, to place subsequent full moulds in said plurality of shelves, to pick subsequent full moulds from the plurality of shelves and to place them in said twist unit, a third robot located in the demoulding chamber and configured to pick subsequent full moulds in the twist unit, to empty subsequent full moulds and to place subsequent empty moulds at the inlet section of said mould transfer conveyor, and a support load-bearing structure comprising a plurality of vertical uprights and a plurality of horizontal beams and bearing a plurality of walls defining said casting chamber, said demoulding chamber and said refrigerated chamber, wherein the first, second and third robots have respective bases fixed to said support load-bearing structure, and wherein the bases of the first, second and third robots are fixed to regions of the support load-bearing structure which define said refrigerated chamber.

2. The robotized line of claim 1, wherein the respective bases of the first, second and third robots are fixed to said support load-bearing structure by respective supports located in proximity to upper ends of said plurality of vertical uprights.

3. The robotized line of claim 1, comprising a demoulded mould control station comprising:

a vision system configured for identifying residual chocolate products in said moulds;

an exit mould roller conveyor configured to move moulds containing residual chocolate products outside said demoulding chamber; and a mould reintegration roller conveyor configured to reintegrate clean moulds inside said demoulding chamber.

4. The robotized line of claim 1, comprising an electronic control unit configured to control in a coordinated way said first, second and third robots.

5. The robotized line of claim 1, comprising a mould heating tunnel configured to heat the moulds moved by the mould transfer conveyor before entering the casting chamber.

6. The robotized line of claim 1, comprising a mould cleaning unit located in proximity to the outlet section of said transfer conveyor.

7. The robotized line of claim 1, wherein said third robot is equipped with pliers comprising at least two fingers and at least two pressure elements operable independently from each other, respectively configured to grab said moulds and to hold a board pushed against a respective mould.

8. The robotized line of claim 1, comprising a board dispenser located in said demoulding chamber, configured to isolate single boards and to provide said boards above respective moulds located in the twist unit.

\* \* \* \* \*